Oct. 15, 1946.                A. J. ELDRED                2,409,262
                            MANIFOLD ASSEMBLY
                           Filed Oct. 18, 1943
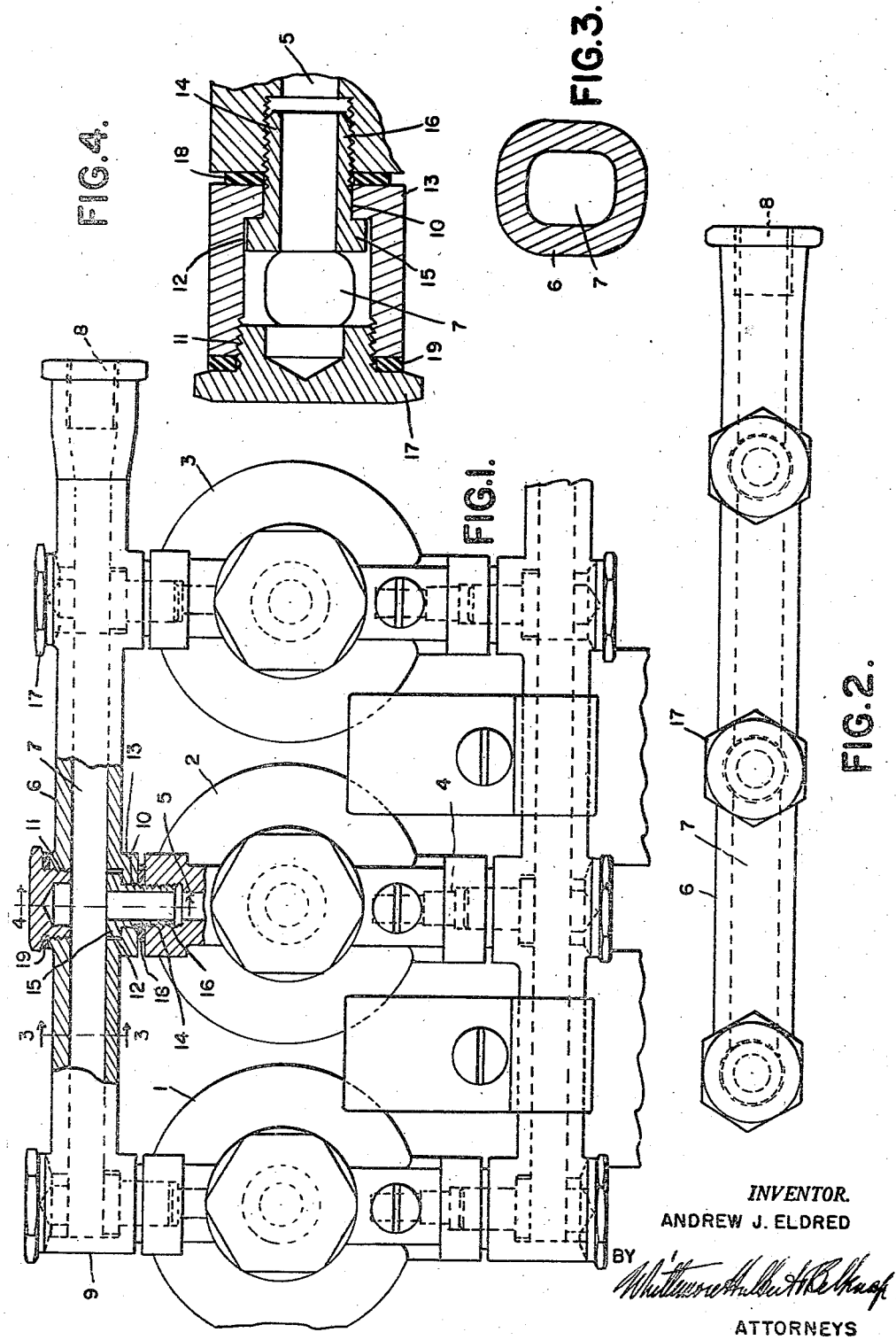
*INVENTOR.*
ANDREW J. ELDRED
BY
ATTORNEYS Patented Oct. 15, 1946

2,409,262

UNITED STATES PATENT OFFICE 2,409,262

MANIFOLD ASSEMBLY

Andrew J. Eldred, Grosse Pointe Farms, Mich., assignor to Autopulse Corporation, Detroit, Mich., a corporation of Michigan Application October 18, 1943, Serial No. 506,785

3 Claims. (Cl. 285—210)

The invention relates to manifold assemblies and refers more particularly to manifold assemblies for attachment to pumping elements.

The invention has for one of its objects to provide an improved manifold assembly comprising a hollow body having a longitudinal passage and hollow bolts for securing the body to pumping elements and placing their inlet ports or their outlet ports in communication with the longitudinal passage, the construction being such that the bolts are at one side of the longitudinal passage and do not obstruct the flow of the fluid through the longitudinal passage.

The invention has for another object to provide a simple construction of manifold assembly the parts of which may be readily manufactured and assembled.

These and other objects of the invention will become apparent from the following description, taken in connection with the accompanying drawing, in which Figure 1 is a plan view, partly in section, of a manifold assembly embodying the invention attached to a plurality of pumping elements;

Figure 2 is a side elevation of the manifold assembly;

Figures 3 and 4 are enlarged cross sections on the lines 3—3 and 4—4, respectively, of Figure 1.

The manifold assemblies embodying the invention are designed particularly for use with pumping elements and especially pumping elements for liquid fuel. As shown in the present instance, 1, 2 and 3 are separate pumping elements each having an inlet port 4 and an outlet port 5. The pumping elements insofar as the present invention is concerned may be of standard construction.

The manifold assemblies for connection to the inlet ports or the outlet ports are alike and therefore but one will be described. In detail, the manifold assembly has the hollow body 6 provided with the longitudinal passage 7 which is open at one end 8 and closed at the other end 9. The body is formed at opposite sides of the longitudinal passage 7 with different sets of transverse holes which are arranged in pairs of axially aligned holes 10 and 11 positioned longitudinally of the body for axial alignment with either the inlet ports or the outlet ports. The body is also formed with the recesses 12 at the inner ends of the holes 10 and adjacent the longitudinal passage 7. To accommodate the holes 10 and 11 and the recesses 12, the body is preferably provided with the longitudinally spaced portions 13 which are polygonal shaped in cross section and of greater cross sectional area than the intermediate portions of the body, as illustrated particularly in Figures 3 and 4. 14 are hollow headed securing bolts insertable through the holes 11 into the holes 10, the heads 15 of the bolts being located in the recesses 12 and the inner ends of the heads being substantially flush with the adjacent side of the longitudinal passage 7. The bolts have the threaded shanks 16 outwardly of the hollow body for threaded engagement with the walls of either the inlet ports or the outlet ports so that the bolts secure the hollow body to the pumping elements. The bolts are adapted to be secured into the port walls by suitable means extending through the holes 11, such as wrenches engaging the passages through the bolts which are polygonally shaped, or spanner wrenches engaging suitable longitudinally extending holes in the bolt heads.

For closing the holes 11 there are the cap screws 17 which are threaded into the walls bounding the holes, the cap screws preferably terminating so that their inner ends are flush with the adjacent wall of the longitudinal passage 7.

Suitable gaskets, such as the gaskets 18 and 19, are preferably provided between the hollow body and the pumping elements and the hollow body and the cap screws.

From the above description it will be readily seen that a simple construction of manifold assembly has been devised for attachment to a plurality of pumping elements. It will be seen that the means for securing the body of the manifold assembly and placing the inlet ports or the outlet ports of the pumping elements in communication with the longitudinal passage of the manifold assembly are located at one side of the longitudinal passage and therefore do not obstruct flow through the longitudinal passage. The flow is also kept smooth and free from eddies, surging or other agitation resulting in a larger delivery of liquid. As a result, the manifold assembly may be of smaller cross section than those heretofore made and at the same time take care of as great amount of flow. It will also be seen that by having one end of the longitudinal passage closed the direction of flow through the manifold assembly may be readily changed by reversing the manifold assembly.

What I claim as my invention is:

1. A manifold assembly for attachment to a plurality of pump elements each of which has a port which comprises a hollow body having a longitudinal passage and transverse holes positioned for axial alignment with the ports, securing bolts extending through the holes and having threaded shanks outwardly of said body for threaded engagement with the walls of the ports, said bolts being located at the same side of the longitudinal passage as the holes and being hollow to place the ports in communication with the longitudinal passage, said hollow body also having other transverse holes for the insertion therethrough of said securing bolts, and cap screws for closing the last mentioned holes.

2. A manifold assembly for attachment to a plurality of ported elements comprising a one piece hollow body having a longitudinal passage and longitudinally spaced portions provided with different sets of transverse holes at opposite sides of the longitudinal passage and recesses at the inner ends of the holes of one set adjacent the longitudinal passage, hollow headed securing bolts insertable through the holes of the other set and having their heads positioned in the recesses and also having threaded shanks extending through the first mentioned holes outwardly of said body for threaded engagement with the walls of the ports of the elements, and closure means for the holes of the other set.

3. A manifold assembly for attachment to a plurality of ported elements comprising a hollow body having a longitudinal passage and different sets of holes at opposite sides of the longitudinal passage, hollow headed securing bolts insertable through the holes of one set into the holes of the other set, said bolts being located entirely at one side of the longitudinal passage and having threaded shanks outwardly of said body for threaded engagement with the walls of the ports of the elements, and closure means for the holes of said first mentioned set.

ANDREW J. ELDRED.